L. DECK.
TERMINAL CHECK VALVE FOR FORCE FEED LUBRICATING SYSTEMS.
APPLICATION FILED OCT. 22, 1913.
1,270,125.
Patented June 18, 1918.
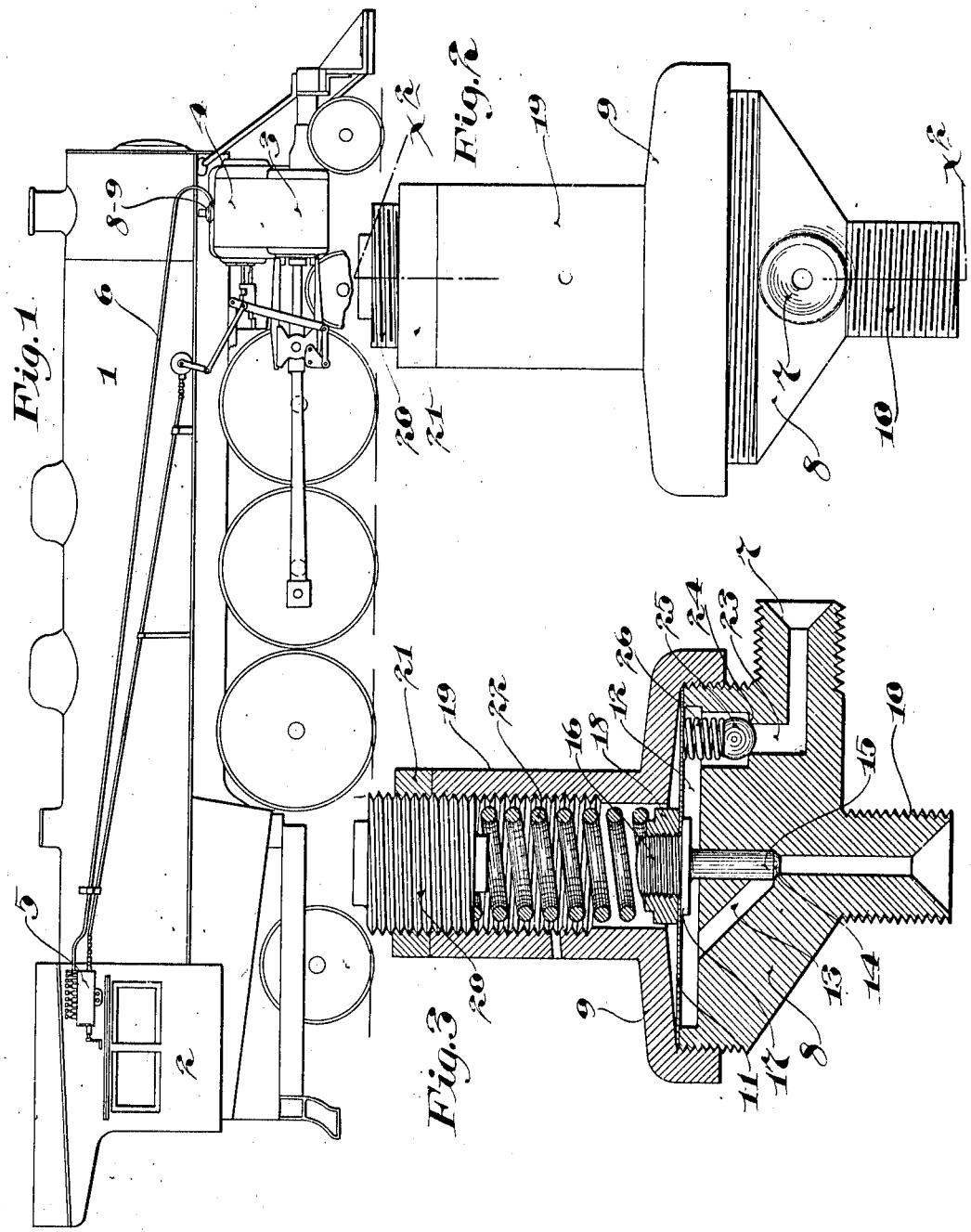
Witnesses:
Geo Knutson
E. C. Skinkle
Inventor:
Louis Deck
By his Attorneys:
Williamson Mucha[?]

UNITED STATES PATENT OFFICE.

LOUIS DECK, OF FORT WAYNE, INDIANA, ASSIGNOR TO McCORD AND COMPANY, OF CHICAGO, ILLINOIS, A CORPORATION OF NEW JERSEY.

TERMINAL CHECK-VALVE FOR FORCE-FEED LUBRICATING SYSTEMS.

1,270,125.  Specification of Letters Patent.  Patented June 18, 1918.

Application filed October 22, 1913. Serial No. 796,642.

*To all whom it may concern:*

Be it known that I, LOUIS DECK, a citizen of the United States, residing at Fort Wayne, in the county of Allen and State of Indiana, have invented certain new and useful Improvements in Terminal Check-Valves for Force-Feed Lubricating Systems; and I do hereby declare the following to be a full, clear, and exact description of the invention, such as will enable others skilled in the art to which it appertains to make and use the same.

My invention relates to force feed lubricating systems such as used on locomotives and elsewhere, and has for its object to provide an improved terminal check valve therefor.

In the accompanying drawings which illustrate my improved check valve applied to the lubricating system of a locomotive, like characters indicate like parts throughout the several views.

Referring to the drawings:

Figure 1 is a view in side elevation showing a locomotive diagrammatically, and shown as applied thereto, a force feed lubricating system including my improved terminal check valve;

Fig. 2 is a side elevation of the terminal check valve showing the same removed from the locomotive and lubricating system; and Fig. 3 is a vertical section taken centrally through the check valve, on the line $x^3$ $x^3$ of Fig. 2.

Of the parts of the locomotive it is only desirable for the purposes of this case to particularly note the boiler 1, cab 2, cylinders 3, and the steam chest 4. Of the parts of the lubricating system, it is only necessary to note the force feed lubricator proper (which includes the pump), indicated as an entirety by the numeral 5, and one of the oil delivery pipes 6, which parts may be of the usual or any suitable construction, in which the oil delivery pipe is arranged to deliver to the coöperating steam chest 4 under the required high pressure. The delivery end of the oil pipe 6 is connected to the threaded nipple 7 of a two-part casing 8—9 of the terminal check valve. The case section 8 is provided with a depending threaded nipple 10 that is adapted to be screwed into the steam chest of the locomotive. Sections 7—8 are connected by threaded engagement and they clamp between them, with an oil tight joint, a diaphragm 11. Between the sections 8—9, and below the diaphragm 11, is an oil chamber 12. A discharge port 13 extends downward from the chamber 12, through the depending nipple 10 and opens into the steam chest. The discharge port 13 is obliquely extended at its upper portion, and at the junction of its vertical portion is formed a valve seat 14. This valve seat 14 is adapted to be engaged by the conical lower end of a discharge valve 15 of the pin or needle type, that is secured to and moved by the diaphragm 11. As shown, the valve 15 is provided with a threaded stem 16 that extends axially through the diaphragm, and with a flange 17 that engages the said diaphragm. A nut 18 is screwed onto the threaded stem 16 of the feed valve 15 and clamps the diaphragm tightly against the flange 17. The nut 18 works in the lower portion of a sleeve-like vertical extension 19 of the upper casing section 9. Working with threaded engagement with the upper end of the sleeve extension 19 is an adjusting screw 20 in the form of a plug that is adapted to be locked in any set adjustment by a lock nut 21 having threaded engagement therewith and impinging against the upper end of the said sleeve extension. A coiled spring 22 is compressed between the adjusting screw 20 and the valve nut 18.

An inlet port 23 extends axially inward through the sleeve 7, and thence upward into the chamber 12, but just below said chamber it is formed with a valve seat 24 that is normally engaged by a check valve 25, preferably in the form of a ball that is held downward by gravity and by a light coiled spring 26, which spring, as shown, is compressed between the said valve and the diaphragm 11.

Operation.

When the engine is running and the lubricator is working with full boiler pressure in the steam chest, the oil enters port 23 and raises check ball 25 against tension of spring 26, which is nominally only a few pounds, and passes into chamber 12 under diaphragm 11. When a sufficient amount of oil has been pumped into this chamber so that the pressure in chamber 12 becomes great enough to overcome the tension of spring 22, which is set for 250 pounds, the diaphragm 11 is deflected upward and pin valve 15 is raised off its seat 14, allowing the oil in chamber 12 to flow down through port 13.

In common locomotive practice, the steam pressure is 200 pounds. With this pressure in the port 13 the higher pressure of oil, namely, 250 pounds, forces the oil into the steam. When the engine is running and the lubricator is working, and there is no steam in the steam chest, the oil follows the same course as described above, and when the pressure of oil in the chamber 12 exceeds 250 pounds, the pin valve raises and the oil is discharged as above. In this case, however, it is discharged against zero steam pressure.

The object of the ball check 25 is not to control the pressure of oil in the conduit 23, but to merely act as a precautionary check. The reason that this type of diaphragm check valve is capable of maintaining a practically constant pressure in the oil delivery line, regardless of the steam pressure against which it is operating, lies in the fact that the area of the pin valve exposed to the steam pressure in port 13 is very small and is practically negligible in comparison with the area of the diaphragm against which the oil acts. The pin valve is usually made about $\frac{1}{8}$ inch in diameter and the port 13 about $\frac{1}{16}$ inch in diameter. The diameter of the diaphragm is approximately 2 inches.

With the above arrangement, it follows that even when the oil is pumped against full boiler pressure, the total upward force of the steam against the bottom of the pin or needle valve, is less than one pound, so that when the valve is delivering oil against full steam pressure, the pressure of the oil in conduit 23 will be less than the 250 pounds for which the spring 22 is set, but an amount equal to the steam pressure multiplied by the small exposed area of the said pin valve. Hence, the said valve maintains a pressure of 250 pounds in the oil pipe, while delivering against no steam pressure, and maintains a pressure of more than 249 pounds when delivering against full steam pressure.

What I claim is:

1. A terminal check valve comprising a casing having an oil chamber with inlet and outlet ports, a spring-pressed diaphragm in said oil chamber, a valve normally closing said discharge port and having a connection to said diaphragm, whereby it is arranged to be moved thereby, a check valve in said inlet port, and a spring compressed between said check valve and said diaphragm.

2. A terminal check valve comprising a two-part casing formed with an oil chamber and inlet and outlet ports leading thereto and therefrom, a diaphragm clamped between the sections of said casing and exposed to the oil pressure within said chamber, a pin valve attached to said diaphragm and normally closing said outlet port, a spring adjusting plug adjustably applied to one of the case sections, a spring compressed between said adjusting plug and said diaphragm and exerting a force tending to hold said valve closed, a check valve in said inlet port, and a coiled spring compressed between said check valve and said diaphragm.

In testimony whereof I affix my signature in presence of two witnesses.

LOUIS DECK.

Witnesses:
W. J. SCHLACKS,
O. H. NEAL.